US012411758B1

United States Patent
Isaac et al.

(10) Patent No.: US 12,411,758 B1
(45) Date of Patent: Sep. 9, 2025

(54) AUTONOMOUS SOFTWARE TESTING AGENT

(71) Applicants: David Pahl Isaac, Bethesda, MD (US); Zachary Joseph Wild, West Falls, NY (US)

(72) Inventors: David Pahl Isaac, Bethesda, MD (US); Zachary Joseph Wild, West Falls, NY (US)

( * ) Notice: Subject to any disclaimer, the term of this patent is extended or adjusted under 35 U.S.C. 154(b) by 170 days.

(21) Appl. No.: 18/180,689

(22) Filed: Mar. 8, 2023

(51) Int. Cl.
*G06F 11/3668* (2025.01)

(52) U.S. Cl.
CPC ...... *G06F 11/3688* (2013.01); *G06F 11/3692* (2013.01)

(58) Field of Classification Search
CPC .......................................... G06F 11/3668–3696
See application file for complete search history.

(56) References Cited

U.S. PATENT DOCUMENTS

| | | | | |
|---|---|---|---|---|
| 9,311,222 B1* | 4/2016 | Avery | ..................... | G06F 9/451 |
| 9,547,579 B1* | 1/2017 | Shen | ................... | G06F 11/3624 |
| 9,600,401 B1* | 3/2017 | Haischt | ................. | G06F 3/0484 |
| 10,613,971 B1* | 4/2020 | Vasikarla | ................ | G06F 40/14 |
| 2004/0041827 A1* | 3/2004 | Bischof | ............... | G06F 9/45512 |
| | | | | 714/E11.208 |
| 2004/0107415 A1* | 6/2004 | Melamed | ............ | G06F 11/3684 |
| | | | | 717/124 |
| 2008/0086627 A1* | 4/2008 | Splaine | ............... | G06F 11/3688 |
| | | | | 715/780 |
| 2009/0070746 A1* | 3/2009 | Dhurjati | .............. | G06F 11/3676 |
| | | | | 717/124 |
| 2009/0307763 A1* | 12/2009 | Rawlins | .............. | G06F 11/2294 |
| | | | | 714/E11.002 |
| 2014/0298297 A1* | 10/2014 | Prasad | ................ | G06F 11/3684 |
| | | | | 717/125 |
| 2015/0082207 A1* | 3/2015 | Prasad | ................ | G06F 11/3696 |
| | | | | 715/762 |

(Continued)

OTHER PUBLICATIONS

Ferdous, Raihana, et al, Towards Agent-Based Testing of 3D Games using Reinforcement Learning, Proceedings of the 37th IEEE/ ACM International Conference on Automated Software Engineering, Jan. 2023, 8 pages, [retrieved on Apr. 25, 2025], Retrieved from the Internet: <URL:http://dl.acm.org/>.*

(Continued)

*Primary Examiner* — Geoffrey R St Leger

(57) ABSTRACT

A system and method for performing autonomous testing of software applications is provided. The system is comprised of an autonomous testing agent; a generalized representation of components, actions, rules, and flows that can be dynamically mapped to application-specific instances; a work queue for items to be tested; a dynamically-constructed model of the application under test; and a log of testing actions and results. The autonomous agent navigates the application under test, discovers interface components and actions, places components and actions in the work queue and/or adds them to the model, executes actions against interface components, applies rules to verify that expected behaviors were exhibited, and logs testing actions and results. The system provides an objective measure of testing by aggregating testing actions and results relative to the application model.

4 Claims, 1 Drawing Sheet

(56) References Cited

U.S. PATENT DOCUMENTS

| | | | | |
|---|---|---|---|---|
| 2015/0301926 | A1* | 10/2015 | Giannelos | G06F 11/3676 |
| | | | | 717/125 |
| 2015/0339213 | A1* | 11/2015 | Lee | G06F 3/0484 |
| | | | | 717/125 |
| 2017/0070534 | A1* | 3/2017 | Bailey | G06F 21/32 |
| 2019/0266076 | A1* | 8/2019 | Maliani | G06F 11/3684 |
| 2019/0384699 | A1* | 12/2019 | Arbon | G06F 11/3698 |

OTHER PUBLICATIONS

Karlsson, Stefan, Exploratory Test Agents for Stateful Software Systems, Proceedings of the 2019 27th ACM Joint Meeting on European Software Engineering Conference and Symposium on the Foundations of Software Engineering, 2019, 4 pages, [retrieved on Apr. 25, 2025], Retrieved from the Internet: <URL:http://dl.acm.org/>.*

* cited by examiner

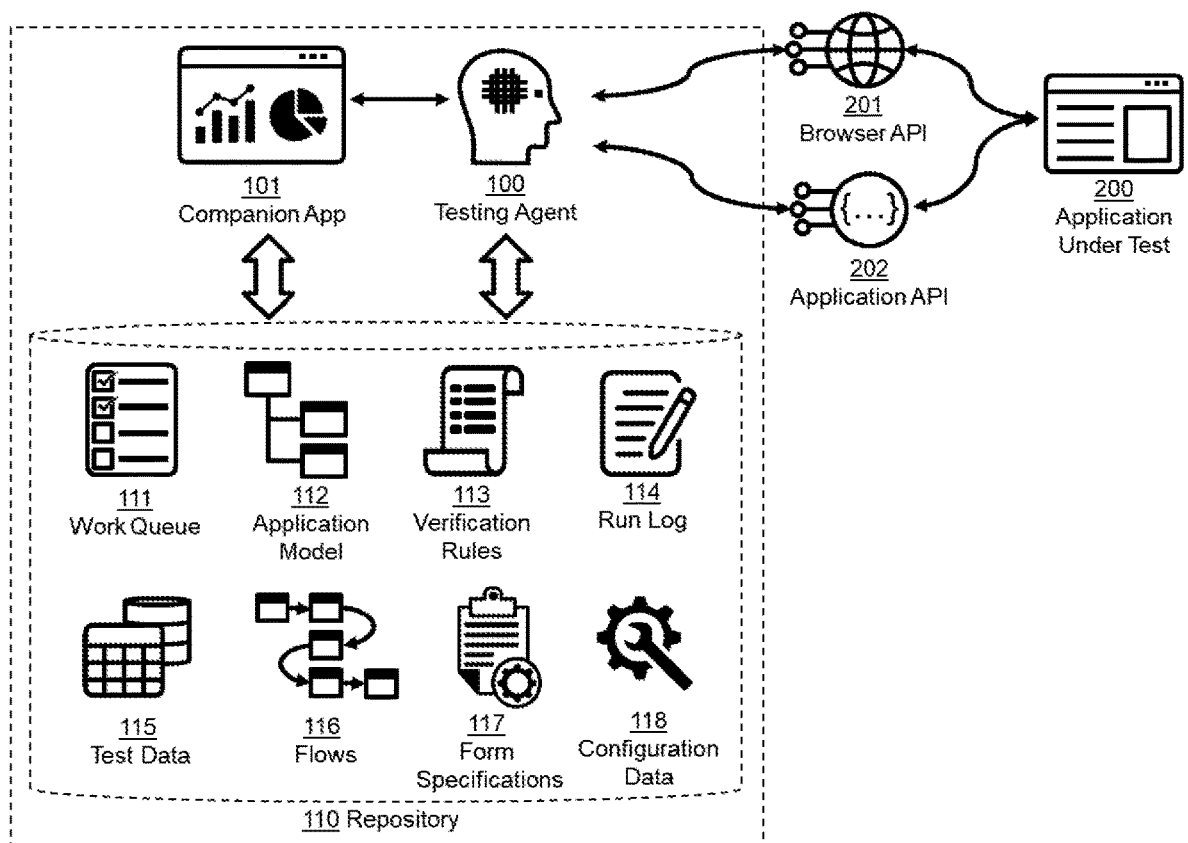

AUTONOMOUS SOFTWARE TESTING AGENT

FIELD OF THE INVENTION

The invention generally relates to automated testing of software applications.

BACKGROUND OF THE INVENTION

Testing is an important part of the software development lifecycle. Testing is required to verify the proper behavior of application software (in terms of functionality, security, accessibility, and performance) prior to use. Two general types of testing commonly employed are "scripted" and "exploratory". In scripted testing, test scripts specify each user action and expected result. In exploratory testing, a tester explores an application in an unscripted manner and notes deviations from expectations based on a combination of common sense, self-consistency, and product specifications. Most application development projects employ a combination of scripted and exploratory testing to ensure thoroughness.

In the recent past, testing of application software was mostly performed manually by human testers. Today, testing is commonly performed using automated test tools because they provide a variety of benefits, including increased testing speed and repeatability. Unfortunately, most test automation tools only support scripted testing. Scripts are written or recorded in machine-readable formats and subsequently run without human intervention. While this approach reduces the labor and cost of running tests multiple times, it does not necessarily reduce the labor or cost of developing the test scripts in the first place. Further, automated test scripts are notoriously fragile in the face of application software changes, resulting in false error reports and additional labor and cost to fix the test scripts.

To address these issues, automated test tool vendors and others have taken steps to improve scripted testing. For example, vendors have been working to make user interface element selectors more robust and resilient with respect to application software updates, and researchers have been developing methods to automatically generate test scripts. While these approaches are useful, they do not fundamentally change the way most automated testing is performed: that is, they still perform scripted execution of pre-specified actions in a pre-defined sequence. As an alternative, a small number of vendors and others have taken steps to automate unscripted testing, typically with tools that perform random actions on the application interface (so called "chaos" or "monkey" testing). None of these tools match the goal-oriented, self-directed, and adaptive behavior exhibited by human testers as required to automate exploratory testing and supplant scripted testing. Consequently, all these tools are limited in their ability to address important challenges in application software testing, including the need to reduce testing effort and cost, improve completeness and rigor, and shorten the time needed to prepare tests of new functionality. In contrast, fully autonomous testing has the potential to automate exploratory testing and supplant scripted testing, thereby providing comprehensive testing of both new and existing application functionality quicker and cheaper than the conventional methods employed by current tools.

SUMMARY OF THE INVENTION

The invention provides a system and method for performing autonomous testing of application software. The invention is comprised of (1) an autonomous testing agent, (2) a generalized representation of application components and actions that can be dynamically mapped to application-specific components and actions, (3) verification rules and application flows expressed using the aforementioned generalized representation, (4) a work queue for components to be tested, (5) a component model of the application under test constructed using the aforementioned generalized representation, and (6) a log of actions performed by the agent along with results of the rules that were applied based on the agent's actions. The agent autonomously navigates the application under test, discovers application components, places components in the work queue and/or adds them to the model, executes actions against application components, runs rules to verify that expected behaviors were exhibited, and logs actions and rule results. The system and method have been implemented in an example embodiment referred to as ASTA (the Autonomous Software Testing Agent) to demonstrate the feasibility, practicality, and effectiveness of the invention.

BRIEF DESCRIPTION OF DRAWINGS

FIG. 1 depicts the logical components of the disclosure.

DETAILED DESCRIPTION OF THE INVENTION

The invention provides a system and method for performing autonomous testing of software applications, wherein testing is conducted by a self-directed software agent rather than prescribed by a pre-defined test script. Autonomous testing enables software applications to be tested without test scripts, which are traditionally used to specify the sequence of actions and expected results in each test. This provides a number of benefits, including reducing or eliminating the time, effort, and associated cost of creating and maintaining test scripts. It also directly automates exploratory testing, providing additional test coverage of application functionality without the time, effort, and cost of manual methods.

This novel method differs from existing methods (including those current methods claiming to be autonomous) in several ways. First is elimination of the requirement for test scripts. In the disclosed method, the agent can dynamically generate test actions, eliminating the need to write, record, or generate test scripts before testing can begin. This means the agent is free to dynamically optimize testing based on any number of criteria without human direction, such as coverage of areas with new functionality, areas with prior issues, or areas most likely to contain issues. Second is the decoupling of test actions from expected results. While conventional methods have both tightly coupled together in a single test script, the disclosed method decouples these two, with actions driven independently by the agent and expected results specified separately in rules that are triggered by agent actions. This allows a given expected result to be uniformly applied to different sequences of actions and different parts of the application. It also allows for inversion of control, because the agent can use rules to drive its actions or can simply let its actions drive rule execution. Third is intelligent (goal directed) behavior: in contrast to those current tools that use crawling or random actions (so-called "monkey testing"), the agent uses its internal algorithms to navigate the application and select actions based on desired testing outcomes (such as defect discovery) and current constraints (such as time available to perform testing). This can greatly increase testing efficiency. Fourth is test generalization: whereas scripted tests used by current tools are specific to a given application (and often a given version of an application), the rules used by the agent are generalized so they can be shared and applied across substantially different applications or variants of the same application. Fifth is the separation of application state from the application model, which greatly simplifies the model while still providing critical state information needed for testing. Additional characteristics identified in the claims further differentiate the invention from current methods.

An embodiment of the invention is comprised of five primary components as illustrated in FIG. 1. During a test run, the autonomous testing agent (100) navigates the application under test (200) and acquires information about the application structure and application components. The agent may use other information (such as software source code) to acquire additional information about the application, its structure, and its testable components, but this is not central to the method. The agent interacts with the application under test using the application programming interface (API) of either a web browser (201) or the application itself (202). The agent identifies application components needed for navigation or testing and places them on a work queue (111) and in the application model (112) for future use. The work queue contains a list of the application components that have been selected for testing or navigation and not yet processed during a test run. The application model contains a linked list of application components representing the application structure. The application model may be generated and updated by the agent prior to testing or concurrent with testing according to user preferences. Users may also place items on the work queue for directed testing, but this is not central to the method.

The agent selects items from the work queue for testing based on desirable testing outcomes (such as defect discovery) and constraints (such as the amount of time available to perform testing). The agent uses a variety of criteria and information at its disposal in making a selection, such as the current application state, the application structure as expressed in the model, the navigation distance to a component, the goals of the test run (e.g., the relative priority of testing new functionality versus existing functionality), and the estimated value of testing a component based on probability of finding defects. The agent then performs one of the allowable actions on a component (such as "click" or "invoke"), retrieves applicable rules from a list of verification rules (113), and applies them to the application response. The verification rules describe the expected behavior of the application in a machine-readable notation. The specific notation is not central to the method, but each rule must identify the application state and component action for which the rule applies, as well as the expected results. More importantly, the notation uses a generalized representation of application components and actions that can be dynamically mapped to application-specific components and actions. As a result, the agent can apply the same rule to different applications, different variants of the same application, and different parts of an application. The generalized representation of components and actions (and associated bindings to instances in the application) may be generated using natural language processing, machine learning, or other classification techniques, but the specific technique is not central to the method. The agent records the actions performed, the rules applied, and rule results in a run log (114), along with other diagnostic information.

The agent uses internal algorithms to dynamically generate test data, construct flows (sequences of actions), and infer specifications for forms and their associated fields. The agent accomplishes this using semantic analysis and other techniques, but the specific techniques are not central to the method. The agent may also use pre-defined test data (115), flows (116), and form specifications (117) to perform testing if so desired by the user. Agent behavior can be tailored using parameters stored in the configuration data (118). A repository (110) provides storage for all persisted data.

A companion user interface (101) provides the ability to start and stop test runs and view/manage all data in the repository. It includes a reporting component that uses the run log and application model to determine test coverage for each model component and for the application as a whole. This provides an objective measure of test completeness. The invention is novel in this regard. Prior methods typically measure test coverage as a percentage of test cases completed. Those that measure coverage relative to the application itself require additional information (such as source code or a separately derived model of the application) and software instrumentation. By contrast, the disclosed method dynamically derives and updates the model from the running application itself and requires no additional instrumentation. This has the advantage of providing a more meaningful and accurate measure of test coverage.

The invention claimed is:

1. A system for autonomous testing of application software, consisting of a network-connected computer system configured to perform fully autonomous testing of application software and comprising:
   (a) an autonomous agent, implemented as stored instructions executed by the computer system, that dynamically analyzes a software application running on a network-connected computer and autonomously performs testing without the use of test scripts;
   (b) generalized verification rules, implemented as text files on persistent storage media, that specify expected results for actions performed in a given context but are not part of a test script, and which are utilized by the autonomous agent to verify an application under test, wherein the generalized verification rules specify the expected results when component actions are performed under various conditions, and where the conditions, components, actions, and expected results use generalized names and patterns, rather than application-specific locators, to enable the autonomous agent to reuse rules across disparate test scenarios and applications; and
   (c) supporting components including an application model and work queue, implemented as data structures in working storage, which are used by the autonomous agent to plan, conduct, and track testing in an autonomous manner.

2. The system of claim 1, wherein the autonomous agent contains algorithms, implemented as instructions executed by a computer system, for selecting application interface components to be explored or tested and for dynamically adapting agent actions in real time based on information from the application model and past test results in order to achieve desired testing outcomes within user-specified constraints.

3. The system of claim 1, wherein the application model is a machine-readable data structure in persistent storage that represents application interface structure and navigation paths, but not application state, and is dynamically created and utilized by the autonomous agent to optimize autonomous testing to meet specified goals and constraints rather than simply to facilitate component location.

4. A method of conducting autonomous testing using the system of claim 1, comprising:
   (a) separating processes and mechanisms for performing testing actions from processes and mechanisms for verifying results such that testing and verifying can be performed independently rather than combining testing and verifying within a test script;
   (b) exploring and testing an application running on a network-connected computer using the autonomous agent, where the exploring and testing is self-directed based on specified testing goals and constraints rather than directed by a test script;
   (c) verifying results of test actions using the generalized verification rules by applying the generalized verification rules to information observed through an application interface with consideration of application context including prior state and test actions; and
   (d) dynamically constructing the application model and the work queue and using the application model and the work queue during a test run, along with prior test results, to optimize selection of application components for further exploration and testing to meet specified testing goals and constraints.

* * * * *